(12) United States Patent
Watanabe et al.

(10) Patent No.: US 6,277,462 B1
(45) Date of Patent: Aug. 21, 2001

(54) OPTICAL RECORDING MEDIUM AND METHOD FOR MANUFACTURE THEREOF

(75) Inventors: Makoto Watanabe; Kazutomo Miyata, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/455,171

(22) Filed: Dec. 6, 1999

(30) Foreign Application Priority Data

Dec. 9, 1998 (JP) .................................................. P10-350536

(51) Int. Cl.$^7$ .................................................... B32B 3/02
(52) U.S. Cl. ...................... 428/64.1; 428/64.3; 428/64.4; 428/913; 430/270.12; 430/945; 369/283; 369/288
(58) Field of Search ................................. 428/64.1, 64.2, 428/64.4, 64.3, 698, 913; 430/270.12, 495.1, 945; 369/283, 288

(56) References Cited

U.S. PATENT DOCUMENTS 5,639,563 * 6/1997 Ohnuki .................................. 428/611
5,965,286 * 10/1999 Ohnuki ............................ 428/694 M

* cited by examiner

*Primary Examiner*—Elizabeth Evans
(74) *Attorney, Agent, or Firm*—Sonnenschein, Nath & Rosenthal

(57) ABSTRACT

In an optical recording medium in which at least a heat diffusion layer, a first dielectric layer, an information recording layer and a second dielectric layer are formed in this order on a substrate and signals are recorded and/or reproduced by the light illuminated from the side of the second dielectric layer, it is desirable to optimize recording and/or reproducing characteristics. With this in view, an under layer 3 for optimizing surface properties of a heat diffusion layer 4 is formed between a disc substrate 2 and the heat diffusion layer 4.

9 Claims, 2 Drawing Sheets

OPTICAL RECORDING MEDIUM AND METHOD FOR MANUFACTURE THEREOF

RELATED APPLICATION DATA

The present application claims priority to Japanese Application No. P10-350536 filed Dec. 9, 1998 which application is incorporated herein by reference to the extent permitted by law.

BACKGROUND OF THE INVENTION

1. Field of the Invention

This invention relates to an optical recording medium in which information writing and/or readout is effected using the light, and a method for manufacture thereof. More particularly, it relates to a magneto-optical disc in which information writing and/or readout is effected using the light illuminated from an opposite side of a substrate, and a method for manufacture thereof.

2. Description of the Related Art

Recently, an optical recording medium in which a heat diffusion layer, a dielectric layer or an information recording layer are formed on a substrate and in which the information is written or read out by the light illuminated on the information recording layer, has come in popular use.

In such optical recording medium, researches are underway for raising the recording density in order to record as much information as possible.

In keeping up with the tendency towards the higher recording density for the optical recording medium, attempts have been made to reduce the diameter of the light spot illuminated on the information recording layer for an optical head configured for writing or reading out signals for the optical recording medium.

In particular, there have recently been conducted researches for constituting a flying optical head by having an objective lens mounted on a slider by application of the technique of the flying magnetic head as used in a hard disc device etc. This flying optical head is flown for facing the layered films on the substrate of the optical recording medium to write or read out information signals from the layered film side of the optical recording medium.

By having the flying optical head flown for facing the layered films on the substrate of the optical recording medium to write or read out information signals, it becomes possible to reduce the distance between the objective lens and the information recording layer of the optical recording medium appreciably in comparison with that in case the light from the optical head is illuminated on the information recording layer via the substrate. This renders it possible to increase the numerical aperture (NA) of the objective lens to reduce the size of the light spot formed on the information recording layer.

If the flying type optical head is flown for facing the layered films on the substrate of the optical recording medium to write or read out the information as described above, the light from the optical head is illuminated from the layered film side. Thus, the layering sequence of the layered films on the substrate in this type of the optical recording medium is reversed from that in the optical recording medium of the type in which the light is illuminated via the substrate.

Meanwhile, if, in the optical recording medium in which the layered films on the substrate are formed in the reverse sequence from that in the optical recording medium irradiated with light via the substrate, the respective layers of the layered films are formed under the conditions similar to those of an optical recording medium of the type illuminated by the light via the substrate, the optical recording medium produced suffers from excessive noise and is lowered in the C/N ratio such that optimum recording and/or reproducing characteristics cannot be achieved.

SUMMARY OF THE INVENTION

It is therefore an object of the present invention to provide an optical recording medium of the type in which a heat diffusion layer, a dielectric layer and an information recording layer are formed on a substrate and the information is written and/or read out by the light illuminated from the layered film side, wherein optimum recording and/or reproducing characteristics can be achieved.

The present inventors have conducted perseverant researches towards solving the above problem, and found that surface properties of a heat diffusion layer constituting a layered film structure appreciably influence recording and/or reproducing characteristics of the optical recording medium, and that, by improving surface properties of the heat diffusion layer, surface properties of the dielectric layer or the information recording layer are improved to achieve optimum recording and/or reproducing characteristics.

The present invention has been brought to completion on the basis of the above information. In one aspect, the present invention provides an optical recording medium in which at least a heat diffusion layer, a first dielectric layer, an information recording layer and a second dielectric layer are formed in this order on a substrate and signals are recorded and/or reproduced by the light illuminated from the side of the second dielectric layer, wherein an under layer for optimizing surface properties of the heat diffusion layer is formed between the substrate and the heat diffusion layer.

In this optical recording medium, the surface properties of the heat diffusion layer are optimized by the under layer provided between the substrate and the heat diffusion layer. In the present optical recording medium, since the surface properties of the heat diffusion layer are optimized, those of the first dielectric layer, information recording layer and the second dielectric layer, formed on the heat diffusion layer, are also optimized. This reduces the noise to realize a high C/N and optimum recording and/or reproducing characteristics.

In another aspect, the present invention provides a method for preparing an optical recording medium in which at least a heat diffusion layer, a first dielectric layer, an information recording layer and a second dielectric layer are formed in this order on a substrate and signals are recorded and/or reproduced by the light illuminated from the side of the second dielectric layer, wherein the method includes forming an under layer for optimizing surface properties of the heat diffusion layer, and subsequently forming the heat diffusion layer on the under layer.

In this manufacturing method for the optical recording medium, in which the heat diffusion layer is formed after forming the under layer on a substrate, the heat diffusion layer having optimum surface properties is formed to optimize the surface properties of the first dielectric layer, information recording layer and the second dielectric layer formed on the heat diffusion layer. Thus, with the manufacturing method of the optical recording medium, an optical recording medium may be provided which has a reduced noise and a high C/N to realize optimum recording and/or reproducing characteristics.

In the optical recording medium according to the present invention, in which an under layer is formed between the substrate and the heat diffusion layer, surface properties of the heat diffusion layer may be optimized to optimize the surface properties of the first dielectric layer, information recording layer and the second dielectric layer formed on the heat diffusion layer. Thus, with the present optical recording medium, optimum recording and/or reproducing characteristics are achieved with the reduced noise and the high C/N.

In the manufacturing method for the optical recording medium according to the present invention, in which the under layer is formed on a substrate and subsequently the heat diffusion layer is formed, it is possible to optimize surface properties of the heat diffusion layer and hence the first dielectric layer, information recording layer and the second dielectric layer formed on the heat diffusion layer. Thus, with the manufacturing method for the optical recording medium, it is possible to produce an optical recording medium having reduced noise and a high C/N to realize optimum recording and/or reproducing characteristics.

DESCRIPTION OF THE PREFERRED EMBODIMENTS

Figure 1:
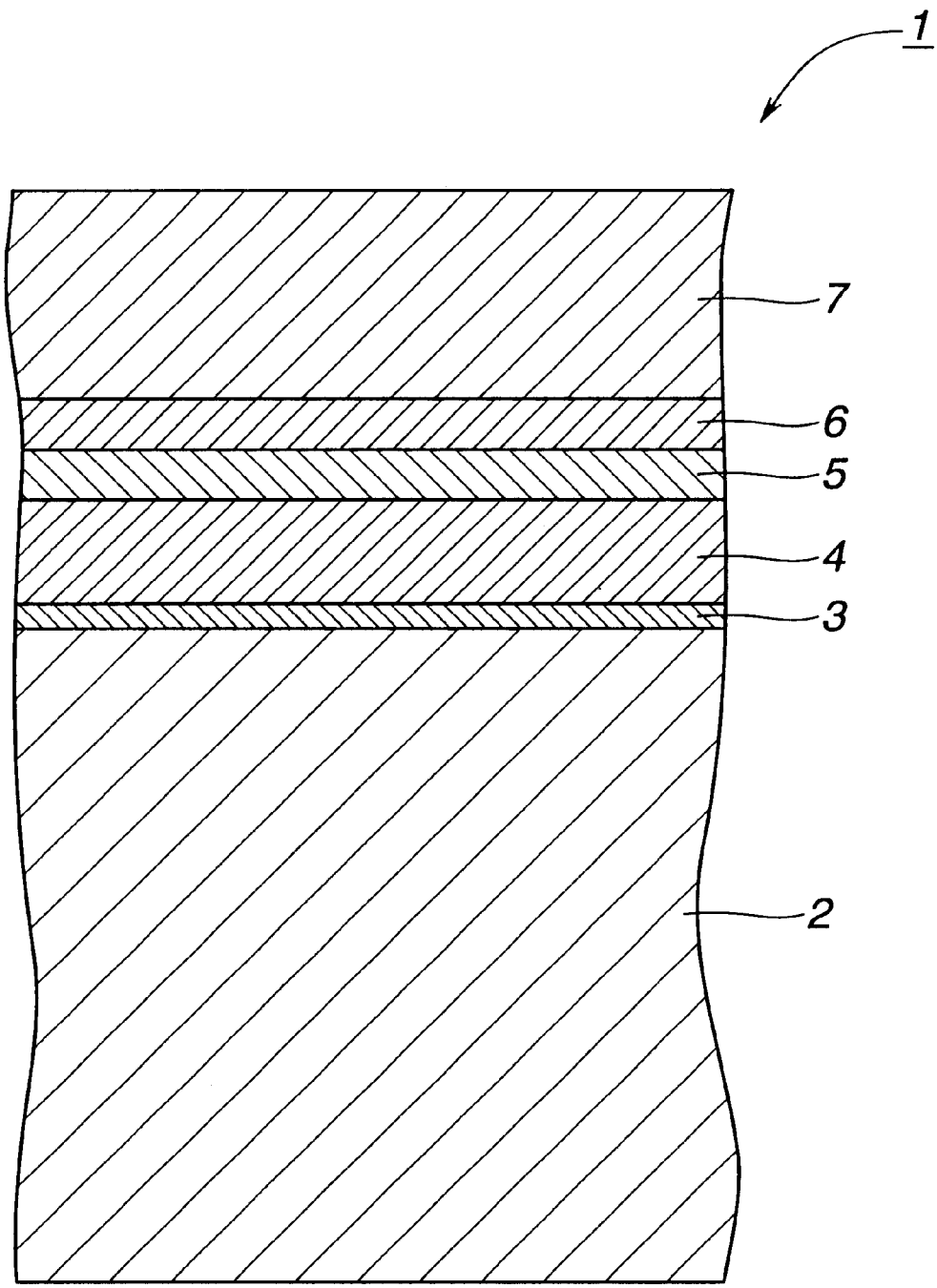
FIG. 1 is a cross-sectional view showing essential portions of a magneto-optical disc.

Referring to the drawings, a preferred embodiment of the present invention will be explained in detail.

In the preferred embodiment, now explained, the present invention is applied to a magneto-optical disc having a disc substrate formed of a resin material to a disc shape and plural layers inclusive of a magneto-optical recording layer formed on the substrate.

The magneto-optical disc according to the present invention is of the type in which light is illuminated by an optical head lying close to the magneto-optical recording layer, as in a flying optical head, from the layered film side, that is from the opposite side with respect to the disc substrate.

Referring to FIG. 1, this magneto-optical disc 1 includes an under layer 3, a heat diffusion layer 4, a first dielectric layer 5, a magneto-optical recording layer 6, and a second dielectric layer 7, layered in this sequence.

The disc substrate 2 is molded in a disc shape by injection molding of a resin material, such as polycarbonate (PC).

The role of the under layer 3 is to optimize surface properties of the heat diffusion layer 4 formed on the under layer 3. The under layer 3 is e.g., a SiFeCoCr film of a film thickness of the order of 10 nm, formed on the disc substrate 2.

The role of the heat diffusion layer 4 is to diffuse the heat due to light illuminated on the magneto-optical recording layer 6 and to improve the reflectance of the light to improve recording characteristics of the magneto-optical recording layer 6. For example, an Al film is formed as this heat diffusion layer 4 on the under layer 3 to a film thickness of approximately 40 nm.

The role of the first dielectric layer 5 is to improve recording characteristics of the magneto-optical disc 1. The first dielectric layer 5 is e.g., a SiN film of a film thickness of the order of 20 nm, formed on the heat diffusion layer 4.

The magneto-optical recording layer 6 demonstrates the magneto-optical effect and is e.g., a TbFeCo film, that is a film employing Tb as a rare earth element and employing Fe and Co as transition metals, with a film thickness of the order of 23 mn, formed on the first dielectric layer 5.

The role of the second dielectric layer 7, similarly to that of the first dielectric layer 5, is to improve the optical efficiency of the magneto-optical disc 1. The second dielectric layer 7 is e.g., a SiN film, formed to a film thickness of the order of 80 nm on the magneto-optical recording layer 6.

Figure 2:
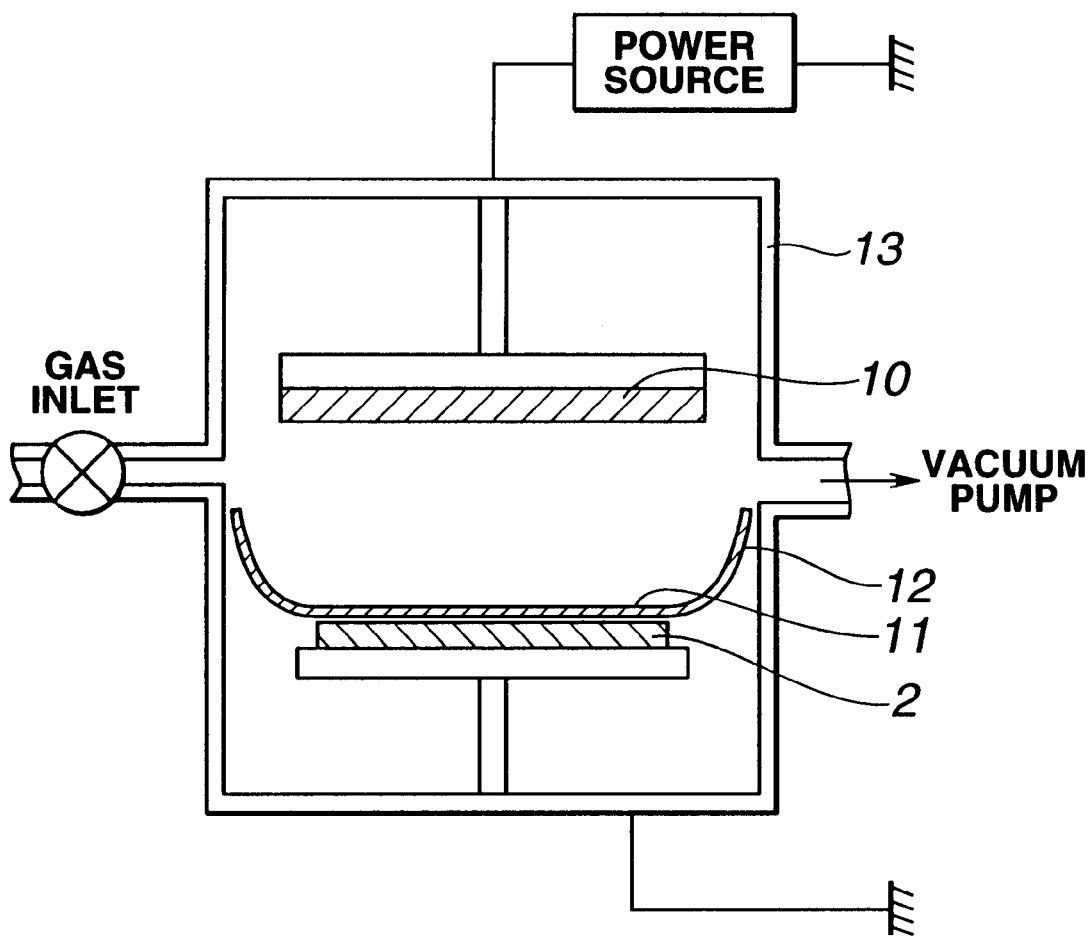
FIG. 2 is a schematic view showing a vacuum chamber used for sputtering.

The above-mentioned layers, formed on the disc substrate 2, are formed by sequentially depositing materials of the layers on the disc substrate 2 by thin film forming techniques, such as sputtering. That is, these layers are sequentially formed by sputtering, with the disc substrate 2 being accommodated in a vacuum chamber 13, housing therein a target 10 of the material constituting the respective layers and a mask 12 having an opening 11, as shown in FIG. 2.

Meanwhile, in forming the respective layers, the sputtering may be carried out in such a manner that, with use of a sole vacuum chamber 13, the target 10 and the mask 12 in the vacuum chamber 13 are exchanged and the vacuum chamber 13 is evacuated each time a layer is formed. Alternatively, a number of vacuum chambers equal to the number of the layers may be provided, and a target 10 and a mask 12 may then be provided in the vacuum chamber 13, with the disc substrate 2 being then sequentially accommodated in the vacuum chamber 13 to effect sputtering to form the respective layers. By providing the dedicated plural vacuum chambers 13 for forming the respective layers, and by sequentially executing the sputtering, it is possible to reduce the time for manufacturing the magneto-optical disc 1 significantly.

With the magneto-optical disc 1, the under layer 3, formed of, for example, SiFeCoCr, is formed on the disc substrate 2. The heat diffusion layer 4, formed on the disc substrate 2 with the interposition of the under layer, is improved in surface properties.

In actuality, the surface roughness Ra of the heat diffusion layer 4, formed by an Al film with a film thickness of approximately 40 nm, formed on the disc substrate 2, with the interposition of the under layer 3 formed by a SiFeCoCr film, with a film thickness of approximately 40 nm and that of the heat diffusion layer 4, directly formed on the disc substrate without the interposition of the under layer, were measured by AFM observation. It was found that the surface roughness Ra of the heat diffusion layer, directly formed on the disc substrate without the interposition of the under layer, was approximately 13 nm, whereas that of the heat diffusion layer, formed with the interposition of the under layer on the disc substrate was approximately 2 nm, thus demonstrating that the heat diffusion layer 4 formed with the interposition of the under layer on the disc substrate 3 exhibits optimum surface properties.

In the magneto-optical disc 1, the heat diffusion layer 4 of which is improved in surface properties, the first dielectric layer 5, magneto-optical recording layer 6 and the second dielectric layer 7, formed on the heat diffusion layer 4, are also improved in surface properties, in comparison with the magneto-optical disc the heat diffusion layer of which is directly formed on the disc substrate. This yields a magneto-optical disc 1 which is reduced in noise to improve the C/N ratio and which exhibits optimum recording and/or reproducing characteristics.

In the foregoing description, such magneto-optical disc 1 is taken as an example, in which the under layer 3 is formed by a SiFeCoCr film of a film thickness of approximately 10 nm, the heat diffusion layer 4 is formed by an Al film of a film thickness of approximately 40 nm, the first dielectric layer 5 is formed by a SiN film of a film thickness of approximately 20 nm, the magneto-optical recording layer 6 is formed by a TbFeCo film of a film thickness of approximately 23 nm, and the second dielectric layer 7 is formed by a SiN film of a film thickness of approximately 80 nm. However, the preferred embodiment is not limited to these specified materials or film thicknesses of the respective layers of the magneto-optical disc 1.

For example, as the material of the under layer 3, TbFeCo, TbFeCoCr, SiN, ZnS.SiO$_2$, SiO$_2$ or diamond-like carbon may also be preferably used in addition to SiFeCoCr. Although other materials than these may be used for the under layer 3, the illustrated materials are particularly desirable because these materials exhibit the effect of optimizing the surface properties of the heat diffusion layer 4 and hence the recording and/or reproducing performance of the magneto-optical disc 1. Although the film thickness of the under layer 3 is not limited to the above given values, the film thickness of the order of 5 to 15 nm is desirable.

As the material for the heat diffusion layer 4, AlTi, AlMg or AlSi, for example, may be used in place of Al. The film thickness of the heat diffusion layer 4 is not limited to the above given values and may desirably be of the order of 20 to 50 nm.

As the material for the first dielectric layer 5, ZnS, SiO$_2$ etc may also be used in addition to SiN. Although the film thickness of the first dielectric layer 5 is not limited to the above given values, the film thickness of the first dielectric layer 5 of the order of 15 to 35 nm is desirable.

As the material of the magneto-optical recording layer 6, TbFeCo mixed with additives, such as Cr or Ni, DyFeCo, GdFeCo or films of alloys thereof, may be used in addition to TbFeCo. Although the film thickness of the magneto-optical recording layer 6 is not limited to that given above, the film thickness of the order of 15 to 120 nm is desirable. The magneto-optical recording layer 6 may be formed by co-sputtering, using targets such as Tb, Dy, Gd, Fe, Co or FeCo, in addition to by sputtering sing alloy targets.

As the material of the second dielectric layer 7, ZnS, SiO$_2$ etc may be used in addition to SiN. Although the film thickness of the second dielectric layer 7 is not limited to the value given above, it is preferably of the order of 40 to 110 nm.

The gas pressure in forming the under layer 3 by sputtering is desirably set to 0.4 to 0.8 Pa. With the magneto-optical disc 1, the under layer 3 of which is formed by sputtering at a gas pressure ranging from 0.4 to 0.8 Pa, it is possible to realize optimum recording and/or reproducing characteristics.

The gas pressure in forming the heat diffusion layer 4 by sputtering is desirably set to 0.1 to 0.6 Pa. With the magneto-optical disc 1, the heat diffusion layer 4 of which is formed by sputtering at a gas pressure ranging from 0.1 to 0.6 Pa, it is possible to realize optimum recording and/or reproducing characteristics.

The power source of the sputtering for depositing the respective layers may be DC or AC, whichever is desired.

Although the foregoing description has been made of a magneto-optical disc 1 for recording and/or reproducing the information, having the magneto-optical recording layer 6 as the information recording layer, by exploiting the magneto-optical effect, the present invention is not limited to this magneto-optical disc 1. For example, the present invention may be applied to an optical recording medium operating under different recording systems, such as a phase-change optical disc configured for recording and/or reproducing the information by exploiting the phase changes of the information recording layer.

EXAMPLES

For confirming the effect of the present invention, the following experiments were conducted.

Experiment 1

10 magneto-optical discs with different materials of the under layers (Examples 1 to 10) and a magneto-optical disc devoid of the under layer (Comparative Example 1) were actually manufactured and measurements were made of the erasure noise (EN) and the C/N of each disc by way of evaluating the recording and/or reproducing characteristics thereof.

Manufacture of Magneto-Optical Disc

First, on 10 disc substrates, there were respectively formed an under layer of SiFeCoCr, an under layer of TbFeCo, an under layer of TbFeCoCr, an under layer of SiN, an under layer of ZnS, an under layer of ZnS.SiO$_2$, an under layer of SiO$_2$, an under layer of diamond-like carbon, an under layer of Si and an under layer of FeCo.

Specifically, a target as a material of the under layer and a mask having a circular opening are mounted in a vacuum chamber. Within the vacuum chamber, a disc substrate formed of polycarbonate is accommodated and the chamber is evacuated to approximately $5 \times 10^{-5}$ Pa. The under layer is formed to a film thickness of the order of 10 nm by introducing an Ar gas at a gas pressure of the order of 0.5 Pa into the vacuum chamber, and by performing sputtering with a target which is to form the under layer, to form the under layer to a film thickness of the order of 10 nm. As the target which is to be the material of the under layer, SiFeCoCr, TbFeCo, TbFeCoCr, SiN, ZnS, ZnS.SiO$_2$, SiO$_2$, C, Si or FeCo, are used. On the 10 disc substrates are deposited under layers formed of ten different materials. Meanwhile, diamond-like carbon, abbreviated herein to DLC, is formed by sputtering by mixing nitrogen or hydrogen into an Ar gas during film forming, using a C target.

On the 10 disc substrates, on which under layers of the ten different materials have been formed, and on the sole disc substrate, on which no under layer has been formed, heat diffusion layers are formed.

Specifically, an AlMg target and a mask having a circular opening are installed in a vacuum chamber. The 10 disc substrates, carrying the under layers, and the sole disc substrate, not carrying the under layer, are sequentially accommodated in the vacuum chamber, which then is again evacuated to approximately $5 \times 10^{-5}$ Pa. Into this vacuum chamber, an Ar gas is introduced under a gas pressure of approximately 0.4 Pa and sputtering by the AlMg target is carried out to form a heat diffusion layer formed by an AlMg film of the order of 40 nm on each of the 10 disc substrates carrying the under layers and the sole disc substrate not carrying the under layer.

Then, on each of the 11 disc substrates, carrying the heat diffusion layers, a dielectric layer is formed.

Specifically, a Si target and a mask having a circular opening are mounted in a vacuum chamber. 11 disc substrates, carrying heat diffusion layers, are sequentially accommodated in the vacuum chamber. Then, in addition to the Ar gas, a N2 gas is introduced into the vacuum chamber, and the gas pressure is set at approximately 0.4 Pa. Then, reactive sputtering by a Si target then is carried out to form a first dielectric layer of SiN with a film thickness of approximately 20 nm on each of the 11 disc substrates now carrying the heat diffusion layers 4. In place of forming the SiN film by reactive sputtering by the Si target, it is also possible to form the SiN film by sputtering using a SiN target.

On each of the 11 disc substrates, now carrying the first dielectric layers, a magneto-optical recording layer 1 is formed.

A TbFeCo target and a mask having a circular opening are mounted in the vacuum chamber. 11 disc substrates, now carrying the first dielectric layers, are sequentially; accommodated in the vacuum chamber, which is again evacuated to approximately $5 \times 10^{-5}$ Pa. An Ar gas is introduced into the vacuum chamber, at a gas pressure of the order of 0.6 Pa, and sputtering is carried out by the TbFeCo target to form a magneto-optical layer of TbFeCo with a film thickness of approximately 23 nm on each of the 11 disc substrates carrying the first dielectric layer.

On each of the 11 disc substrates, now carrying the magneto-optical layer, a second dielectric layer then is formed.

Specifically, a Si target and a mask having a circular opening are mounted within the vacuum chamber. Within this vacuum chamber are accommodated 11 disc substrates, carrying the magneto-optical recording layers, and the $N_2$ gas is introduced, along with the Ar gas, into the vacuum chamber. The gas pressure is set to the order of 0.4 Pa. A second dielectric layer of SiN, with a film thickness of the order of 80 nm, is formed on each of the 11 disc substrates, carrying the magneto-optical recording layer, by sputtering, using a Si target. In place of forming the SiN film by reactive sputtering by the Si target, it is also possible to form the SiN film by sputtering using a SiN target.

By the above method, 10 magneto-optical discs, having the under layers of respective different materials (Examples 1 to 10), and the sole magneto-optical disc not having the under layer (Comparative Example 1) were prepared.

Evaluation of Recording and/or Reproducing Characteristics

On the 10 magneto-optical discs of the Examples 1 to 10, manufactured as described above, and the magneto-optical disc of the Comparative Example 1, the information was recorded by a recording and/or reproducing apparatus and the C/N ratio on reproducing the recorded information and the noise level on erasing the recorded information at 1 MHz (erasure noise: EN) were checked to evaluate the recording and/or reproducing characteristics.

A recording and/or reproducing apparatus having a rotational driving system for rotationally driving the disc at a linear speed of approximately 6.5 m/sec, a light source of a wavelength of 680 nm and an objective lens with a numerical aperture NA of 0.6 was used. By this recording and/or reproducing apparatus, the information with the frequency of 6.25 MHz was recorded on each of the 11 magneto-optical discs, with the recording magnetic field of 300 Oe, and with the recording power set to a high level of 10 mW and a low level of 0.5 mW. The information recorded on the 11 magneto-optical discs was reproduced with the reproducing power of 1 mW and the C/N ratio was measured at the same time as the erasure noise (EN) on erasing the information recorded on the 11 magneto-optical discs was measured. The results are shown in Table 1.

TABLE 1

| | types of under layers | C/N | EN |
|---|---|---|---|
| Ex. 1 | SiFeCoCr | 46 dB | −57 dB |
| Ex. 2 | TbFeCo | 45 dB | −55 dB |

TABLE 1-continued

| | types of under layers | C/N | EN |
|---|---|---|---|
| Ex. 3 | TbFeCoCr | 45 dB | −56 dB |
| Ex. 4 | SiN | 45 dB | −53 dB |
| Ex. 5 | ZnS | 45 dB | −53 dB |
| Ex. 6 | ZnS.SiO$_2$ | 45 dB | −54 dB |
| Ex. 7 | SiO$_2$ | 46 dB | −54 dB |
| Ex. 8 | DLC | 46 dB | −56 dB |
| Ex. 9 | Si | 42 dB | −51 dB |
| Ex. 10 | FeCo | 40 dB | −50 dB |
| Comp. Ex. 1 | none | 40 dB | −48 dB |

It is seen from the results shown in Table 1 that the magneto-optical discs of the Examples 1 to 10, on the disc substrates of which the heat diffusion layers are formed via the under layers, are higher in C/N and lower in EN than the magneto-optical disc on the disc substrate of which the heat diffusion layer is directly formed, with the magneto-optical discs of the Examples 1 to 10 thus exhibiting optimum recording and/or reproducing characteristics. It is also seen that, if SiFeCoCr, TbFeCo, TbFeCoCr, SiN, ZnS, ZnS.SiO$_2$, SiO$_2$ or DLC is used as a material of an under layer, a particularly high C/N ratio is realized and the EN is appreciably lowered to improve optimum recording and/or reproducing characteristics.

Experiment 2

Five magneto-optical discs with different film thicknesses of the under layers (Examples 11 to 13 and Comparative Examples 2 and 3) were produced and measurements were made of the erasure noise (EN) and C/N of the respective magneto-optical discs to check into the film thickness dependency on the film thickness of the under layer of the recording and/or reproducing characteristics.

SiFeCoCr was used as the under layer material. Using the same structures and the same forming conditions of the layers other than the under layer as those used in the experiment 1, a magneto-optical disc with a film thickness of 1 nm of the under layer (Comparative Example 2), a magneto-optical disc with a film thickness of 5 nm of the under layer (Example 11), a magneto-optical disc with a film thickness of 10 nm of the under layer (Example 12), a magneto-optical disc with a film thickness of 15 nm of the under layer (Example 13) and magneto-optical disc with a film thickness of 20 nm of the under layer (Comparative Example 3), were prepared. The C/N and EN of the respective magneto-optical discs were checked in the same manner as in Experiment 1. The results are shown in Table 2.

TABLE 2

| | film thickness of the under layer (nm) | EN | C/N |
|---|---|---|---|
| Comp. Ex. 2 | 1 | −50 dB | 42 dB |
| Ex. 11 | 5 | −54 dB | 42 dB |
| Ex. 12 | 10 | −57 dB | 46 dB |
| Ex. 13 | 15 | −55 dB | 45 dB |
| Comp. Ex. 3 | 20 | −50 dB | 41 dB |

As shown in Table 2, the magneto-optical discs with the film thicknesses of the under layers of 5 to 15 nm (Examples 11 to 13) are higher in C/N and lower in EN than a magneto-optical disc with the film thickness of the under layer of 1 nm (Comparative Example 2) or a magneto-optical disc with the film thickness of the under layer of 20 nm. It is thus seen that, if the film thickness of the under layer of a magneto-optical disc is set to 5 to 15 nm, a particularly high C/N and appreciably low EN are realized to realize particularly superior recording and/or reproducing characteristics.

Experiment 3

Five magneto-optical discs (Examples 14 and 15 and Comparative Examples 4 to 6) were prepared as the gas pressure of the Ar gas in forming the under layer by sputtering was changed and measurements were made of the erasure noise (EN) and C/N of the respective magneto-optical discs to check into the gas pressure dependency of the recording and/or reproducing characteristics in generating the under layers.

Using the structures and the forming conditions of the respective layers similar to those in Experiment 1, except using SiFeCoCr as the material of the under layer and changing the gas pressure of the Ar gas in forming the under layer, a magneto-optical disc having an under layer formed at the Ar gas pressure of 0.1 Pa (Comparative Example 4), a magneto-optical disc having an under layer formed at the Ar gas pressure of 0.2 Pa (Comparative Example 5), a magneto-optical disc having an under layer formed at the Ar gas pressure of 0.4 Pa (Example 14), a magneto-optical disc having an under layer formed at the Ar gas pressure of 0.8 Pa (Example 15) and a magneto-optical disc having an under layer formed at the Ar gas pressure of 1.0 Pa (Comparative Example 6) were prepared. The C/N and EN of the respective magneto-optical discs were checked by a method similar to that of the Experiment 1. The results are shown in Table 3.

TABLE 3

| | gas pressure (Pa) | EN | C/N |
|---|---|---|---|
| Comp. Ex. 4 | 0.1 | −50 dB | 42 dB |
| Comp. Ex. 5 | 0.2 | −52 dB | 42 dB |
| Ex. 14 | 0.4 | −57 dB | 46 dB |
| Ex. 15 | 0.8 | −55 dB | 45 dB |
| Comp. Ex. 6 | 1 | −50 dB | 41 dB |

As may be seen from Table 3, the magneto-optical discs having the under layers formed at an Ar gas pressure of 0.4 to 0.8 Pa (Examples 14 and 15) are higher in C/N and lower in EN than the magneto-optical disc having the under layer formed at an Ar gas pressure of 0.1 Pa (Comparative Example 4), magneto-optical discs having the under layers formed at an Ar gas pressure of 0.2 Pa (Comparative Example 5) or the magneto-optical disc having the under layer formed at an Ar gas pressure of 1.0 Pa (Comparative Example 6). Thus, it is seen that if, in a magneto-optical disc, the gas pressure of the Ar gas in forming the under layer to 0.4 to 0.8 Pa, a particularly high C/N can be realized with an appreciably low EN to produce optimum recording and/or reproducing characteristics.

Experiment 4

Four magneto-optical discs with different types of the materials of the heat diffusion layer (Examples 16, 17 and Comparative Examples 7,8) were prepared and the erasure noise (EN) and the C/N of the respective magneto-optical discs were measured to check into the heat diffusion layer material dependency of the recording and/or reproducing characteristics.

SiFeCoCr was used as a material of the under layer. Using the structures and the forming conditions of the respective layers similar to those of the Experiment 1, except changing the material of the heat diffusion layer, a magneto-optical disc having the heat diffusion layer of AlMg (Example 16), a magneto-optical disc having the heat diffusion layer of AlAg (Example 17), a magneto-optical disc having the heat diffusion layer of Al (Comparative Example 7) and a magneto-optical disc having the heat diffusion layer of AlTi (Comparative Example 8) were prepared. The C/N and EN of the respective magneto-optical discs were checked by the same method as that used in Experiment 1. The results are shown in Table 4.

TABLE 4

| | heat diffusion layer | EN | C/N |
|---|---|---|---|
| Ex. 16 | AlMg | −57 dB | 46 dB |
| Ex. 17 | AlAg | −56 dB | 45 dB |
| Comp. Ex. 7 | Al | −49 dB | 39 dB |
| Comp. Ex. 8 | AlTi | −50 dB | 40 dB |

As may be seen from Table 4, the magneto-optical disc having a heat diffusion layer of AlMg (Example 16) or the magneto-optical disc having a heat diffusion layer of AlAg (Example 17) are higher in C/N and lower in EN than a magneto-optical disc having a heat diffusion layer of Al (Comparative Example 7) or a magneto-optical disc having a heat diffusion layer of AlTi (Comparative Example 8). This is presumably due to the fact that use of AlMg or AlAg as a material of the heat diffusion layer yields surface properties better than those obtained by using Al or AlTi. It is thus seen that, by using an alloy of Al and at least one of Mg and Ag as a material of the heat diffusion layer, the magneto-optical disc is particularly high in S/N and appreciably reduced in EN to yield particularly satisfactory recording and/or reproducing characteristics.

Experiment 5

Five magneto-optical discs were prepared as the gas pressure of the Ar gas in forming the heat diffusion layer by sputtering was changed (Examples 18 to 20 and Comparative Examples 9 and 10) and measurement was made of the erasure noise (EN) and C/N of the respective magneto-optical discs to check into the gas pressure dependency of the recording and/or reproducing characteristics in forming the under layers.

Using the structures and the forming conditions of the respective layers similar to those in Experiment 1, except using SiFeCoCr as the material of the under layer and changing the gas pressure of the Ar gas in forming the heat diffusion layer, a magneto-optical disc having an heat diffusion layer formed at the Ar gas pressure of 0.1 Pa (Example 18), a magneto-optical disc having an heat diffusion layer formed at the Ar gas pressure of 0.2 Pa (Example 19), a magneto-optical disc having an heat diffusion layer formed at the Ar gas pressure of 0.6 Pa (Example 20), a magneto-optical disc having an heat diffusion layer formed at the Ar gas pressure of 0.8 Pa (Comparative Example 9) and a magneto-optical disc having an heat diffusion layer formed at the Ar gas pressure of 1.0 Pa (Comparative Example 10) were prepared. The C/N and En of the respective magneto-optical discs were checked. The results are shown in Table 5.

TABLE 5

|  | gas pressure (Pa) | EN | C/N |
|---|---|---|---|
| Ex. 18 | 0.1 | −56 dB | 45 dB |
| Ex. 19 | 0.2 | −57 dB | 46 dB |
| Ex. 20 | 0.6 | −57 dB | 46 dB |
| Comp. Ex. 9 | 0.8 | −50 dB | 42 dB |
| Comp. Ex. 10 | 1.0 | −50 dB | 41 dB |

As may be seen from the above Table 5, the magneto-optical discs having the heat diffusion layers formed under the Ar gas pressure of 0.1 to 0.6 Pa (Examples 18 to 20) are higher in C/N and lower in EN than the magneto-optical disc having the heat diffusion layers formed under the Ar gas pressure of 0.8 Pa (Comparative Example 9) or the magneto-optical disc having the heat diffusion layers formed under the Ar gas pressure of 1.0 Pa (Comparative Example 10). It is thus seen that, by setting the gas pressure of the Ar gas to 0.1 to 0.6 Pa in forming the heat diffusion layer of the magneto-optical disc, a particularly high C/N is obtained and the EN is appreciably reduced to realize optimum recording and/or reproducing characteristics. Meanwhile, the gas pressure lower than 0.1 Pa is not desirable because then the heat diffusion layer is difficult to form by sputtering because of the excessively low gas pressure.

What is claimed is:

1. An optical recording medium in which at least a heat diffusion layer, a first dielectric layer, an information recording layer and a second dielectric layer are formed in this order on a substrate and signals are recorded and/or reproduced by the light illuminated from the side of the second dielectric layer, wherein an under layer for optimizing surface properties of the heat diffusion layer is formed between said substrate and the heat diffusion layer.

2. The optical recording medium according to claim 1 wherein said under layer is formed of SiFeCoCr, TbFeCo, TbFeCoCr, SiN, ZnS, ZnS.SiO$_2$, SiO$_2$ or diamond-like carbon.

3. The optical recording medium according to claim 1 wherein the film thickness of said under layer is within a range of 5 to 15 nm.

4. The optical recording medium according to claim 1 wherein said heat diffusion layer is formed of an alloy of Al with at least one of Mg and Ag or Ag with at least one of Pd, Cu and Ti.

5. A method for preparing an optical recording medium in which at least a heat diffusion layer, a first dielectric layer, an information recording layer and a second dielectric layer are formed in this order on a substrate and signals are recorded and/or reproduced by the light illuminated from the side of the second dielectric layer, comprising:

forming an under layer for optimizing surface properties of the heat diffusion layer, and subsequently forming said heat diffusion layer on said under layer.

6. The method according to claim 5 wherein said under layer is formed from SiFeCoCr, TbFeCo, TbFeCoCr, SiN, ZnS, ZnS.SiO$_2$, SiO$_2$ or diamond-like carbon.

7. The method according to claim 5 wherein said under layer is formed by sputtering with the gas pressure for sputtering being set to 0.4 to 0.8 Pa.

8. The method according to claim 5 wherein said heat diffusion layer is formed of an alloy of Al with at least one of Mg and Ag or Ag with at least one of Pd, Cu and Ti.

9. The method according to claim 5 wherein said heat diffusion layer is formed by sputtering with the gas pressure for sputtering being set to 0.1 to 0.6 Pa.

* * * * *